United States Patent
Kroll et al.

(10) Patent No.: US 7,126,486 B2
(45) Date of Patent: Oct. 24, 2006

(54) METHOD AND APPARATUS FOR MOISTURE DETECTION IN EXTERIOR SHEATHING OF RESIDENTIAL AND COMMERCIAL BUILDINGS

(75) Inventors: Richard E. Kroll, Taunton, MA (US); Todd E. Watson, West Warwick, RI (US)

(73) Assignee: Dryvit Systems, Inc., West Warwick, RI (US)

( * ) Notice: Subject to any disclaimer, the term of this patent is extended or adjusted under 35 U.S.C. 154(b) by 0 days.

(21) Appl. No.: 10/060,183

(22) Filed: Jan. 30, 2002

(65) Prior Publication Data

US 2002/0130781 A1 Sep. 19, 2002

(51) Int. Cl.
*G08B 21/00* (2006.01)
(52) U.S. Cl. .................. 340/604; 340/539.1; 340/602; 340/605; 340/618; 340/620; 73/29.01; 73/73; 137/312
(58) Field of Classification Search ............... 340/604, 340/602, 603, 605, 616, 618, 620, 539.1; 73/29.01, 73; 324/715; 137/312
See application file for complete search history.

(56) References Cited

U.S. PATENT DOCUMENTS

| | | | |
|---|---|---|---|
| 4,166,244 A * | 8/1979 | Woods et al. ............... 324/693 |
| 4,197,866 A | 4/1980 | Neal |
| 4,227,190 A | 10/1980 | Kelley et al. |
| 4,259,633 A | 3/1981 | Rosenau |
| 4,264,902 A | 4/1981 | Miller |
| 4,598,273 A | 7/1986 | Bryan, Jr. et al. |
| 4,892,113 A | 1/1990 | Fattahi |
| 4,965,554 A | 10/1990 | Darling |
| 5,008,652 A | 4/1991 | Woloszyk |
| 5,081,422 A | 1/1992 | Shih |
| 5,082,173 A | 1/1992 | Poehlman et al. |
| 5,106,339 A | 4/1992 | Braun et al. |
| 5,176,316 A | 1/1993 | Whitman |
| 5,337,957 A | 8/1994 | Olson |
| 5,546,009 A | 8/1996 | Raphael |
| 5,661,406 A * | 8/1997 | Daily et al. ................. 324/713 |

(Continued)

OTHER PUBLICATIONS

Artice—A. TenWolde and G.E. Courville, Ph.D., "Insturument for Measuring Moisture in Building Envelopes," HI-85-22 No. 3, pp. 1101-1115 date unknown.

(Continued)

*Primary Examiner*—Davetta W. Goins
(74) *Attorney, Agent, or Firm*—Fay, Sharpe, Fagan, Minnich & McKee, LLP (57) ABSTRACT

An automated device monitors moisture content in exterior sheathing of a building for detecting moisture intrusion into the sheathing walls. A plurality of moisture sensors are embedded in selected exterior walls of the building behind the cladding and are adapted to provide signals representative of the moisture content in the walls at each of the selected locations. A control unit is operatively connected with each of the plurality of moisture sensors for generating an alarm signal when at least one of the signals representative of the moisture content in the plurality of walls is indicative of a moisture content in excess of a predetermined threshold value. Each moisture sensor is preferably in the form of a pair of spaced apart elongate conductive probe members having a substantial portion thereof from a lead end embedded into a substrate of the exterior building walls, and a connection end extending outwardly from the first wall for enabling electrical connection of each moisture sensor to the control unit. An audible or visual alarm is generated when moisture is detected. Electronic communication of alarm signals are further provided for moisture monitoring from a distance.

31 Claims, 4 Drawing Sheets

U.S. PATENT DOCUMENTS

| | | | |
|---|---|---|---|
| 5,730,024 | A | 3/1998 | Sahlen |
| 5,748,092 | A | 5/1998 | Arsenault et al. |
| 5,818,340 | A * | 10/1998 | Yankielun et al. ........... 340/602 |
| 5,881,951 | A | 3/1999 | Carpenter |
| 5,886,636 | A | 3/1999 | Toomey |
| 5,889,468 | A * | 3/1999 | Banga ........................ 340/628 |
| 6,016,971 | A * | 1/2000 | Welch et al. ................. 239/63 |
| 6,025,788 | A * | 2/2000 | Diduck .................. 340/870.16 |
| 6,104,298 | A | 8/2000 | Flanders |
| 6,170,798 | B1 * | 1/2001 | Johnson et al. ............... 251/68 |
| 6,225,909 | B1 * | 5/2001 | Nill, Jr. ...................... 340/604 |
| 6,250,091 | B1 * | 6/2001 | Jerome ........................ 62/171 |
| 6,420,973 | B1 * | 7/2002 | Acevedo ..................... 340/628 |
| 6,552,647 | B1 * | 4/2003 | Thiessen et al. ............. 340/3.1 |

OTHER PUBLICATIONS

An Office Action from the Canadian Intellectual Property Office dated Mar. 30, 2004; 4 pages.

Monitoring the Performance of Masonry Building Envelopes by Maurenbrecher, et al.; Pub. in the Proceedings of the 12th Int'l. Brick/Block Masonry Conference, Madrid, Spain, Jun. 25-28, 2000, vol. 2, (8 pages).

Long-Term Field Monitoring of an EIFS Clad Wall by Nady, et al; Institute of Research in Construction, Nat'l. Research Council, (16 pages).

NILU Information-WETCORR in Buildings—No. 2 1994 (2 pages).

Moisture Measurement Guid for Building Envelope Applications by Said, M.N, Research Report #190; Date of Issue: Aug. 20, 2004 (35 pages).

System and Methods for Assessing Conservation State and Environmental Risks for Outer Wooden Parts of Cultural Building (Wood-Assess) from Environment and Climate 1994-1998; Presented by Dr. ing. Svein E. Haagenrud at Coordinators Meeting, Brussels May 13, 1996 (20 pages).

Monitoring the Wetness Impact on Buildings by Means of a New Instrument for Continuous Recordings (Eureka EU 615 Eurocare WETCORR) by Henriksen, et al.; UNESCO/RILEM Congress on the Conservation of Stone and Other Materials; Paris, Jun. 29-Jul. 1, 1993 (9 pages).

WETCORR Instrument Used for Measuring the Wetness Impact on Stone Facades—Step-CT90-0107 by Haagenrud, et al., Apr. 1997 (18 pages).

RingSys—WetCorr User's Manual, Leif Marsteen; Aug. 1995 (46 pages).

The Eureka Project EU 615 Eurocare WETCORR- Report from the NBS-MK Seminar at ABB Conference Centre, Billingstad, Nov. 24, 1993 by Henriksen, et al., Jul. 1994 (142 pages).

Canadian Intellectual Property Office—Office Action, pp. 1-3, Date: Aug. 27, 2003, to Sim & McBurney.

* cited by examiner

METHOD AND APPARATUS FOR MOISTURE DETECTION IN EXTERIOR SHEATHING OF RESIDENTIAL AND COMMERCIAL BUILDINGS

BACKGROUND OF THE INVENTION

The present invention is directed to the art of moisture detection systems. More particularly, the present invention is directed to an automated moisture detection system for monitoring the moisture content in the exterior walls or outer sheathing of commercial or residential structures and will be described with particular attention thereto. It is to be appreciated, however, that the present invention has a wide range of applications and uses such as, for example, in monitoring the moisture content in other components of buildings and for monitoring moisture in a wide range of manufacturing or industrial processes.

The present invention finds particular application in connection with buildings covered with cladding systems such as, for example, brick, metal or vinyl siding products. Most cladding systems are typically not designed to drain water that may unintentionally penetrate past the exterior cladding due to defective window construction improper installation, the lack of proper flashing, or the like. Such deficiencies may lead to certain moisture induced damage to the materials beneath the cladding system.

As a further concern, weather resistive barriers are typically not provided beneath the cladding on commercial buildings and are often installed incorrectly on residential buildings. Furthermore, cavities on certain drainable cladding systems may become plugged or otherwise disabled, leading to accumulated moisture with no means of discharge from behind the cladding.

The damage to the building materials behind the exterior cladding is most often hidden and therefore usually undetectable by outer visual inspection. After prolonged periods of moisture ingress and/or moisture retention, damage occurs, usually in the form of mold, rot, and dimensional instability. There is no known automated, reliable technique for periodically testing for There is a need, therefore, to provide a system for detecting moisture in building components on a substantially continuous basis so that elevated moisture levels in the building materials monitored may be immediately discovered and appropriately addressed quickly before any significant damage to the building materials can take place.

It would further be desirable to provide an automated moisture monitoring system that includes a central control unit connected to a plurality of moisture sensors, each of the moisture sensors being disposed in a different exterior wall portion of the monitored structure. In that way, each wall of the monitored structure can be interrogated on a regular and substantially continuous basis by the control unit for generating suitable alarms or the like when the moisture content in any of the monitored building walls exceeds a predetermined threshold.

Still further, it would be desirable to provide a monitoring system that generates audible or visual alarms when elevated moisture levels are detected in at least one exterior wall of the monitored structure. In addition, an electronic modem communication circuit would be advantageous in conjunction with the control unit for transmitting the moisture alarm signal to remote locations such as, for example, to a commercial service that provides notification to the building owner followed by a communication to appropriate service crews to effect necessary repairs, or the like.

SUMMARY OF THE INVENTION

The subject invention provides a method and apparatus for moisture detection in buildings with hard outer cladding that overcomes the above-noted problems through automated interrogation of moisture levels in the exterior walls of the structure and alarm signal generation when the detected moisture level in any of the monitored walls exceeds a predetermined threshold value.

In particular, and in accordance with one aspect of the invention, there is provided an apparatus for monitoring moisture content in sheathing of a building behind an exterior cladding system. The apparatus comprises a plurality of moisture sensors embedded respectively in a plurality of exterior walls of the building, and a control unit operatively connected with the a plurality of moisture sensors for generating an alarm signal when at least one of the moisture sensors detects a moisture level above a predetermined threshold value. Preferably, the plurality of moisture sensors installed in the building exterior walls each exhibit a resistance characteristic that varies in relation to the moisture content in the plurality of walls. In that way, the moisture sensors provide signals representative of the moisture content in the walls.

In accordance with a further aspect of the invention, the control unit includes an excitation signal circuit for generating an excitation signal applied to each of the plurality of moisture sensors. Each of the plurality of moisture sensors generates a signal representative of the moisture content in the respective wall in response to application of the excitation signal.

In yet a still further aspect of the invention, each of the moisture sensors includes a pair of spaced apart elongate conductive probe members embedded into the respective substrates of first and second walls of the structure, respectively. Further, each moisture sensor defines a connection end extending outwardly from the first and second walls, respectively, for enabling an electrical connection between the first and second moisture sensors and the control unit. The probe members are spaced apart about ¾ inch. However, other suitable probe spacings can be used as well.

Preferably, for purposes of automation, the control unit is adapted to generate, at preselected time intervals, a periodic excitation signal for selective multiplexed application to each of the plurality of moisture sensors. The moisture sensors, in turn, generate a plurality of signals representative of the moisture content in each of the plurality of monitored walls. The moisture content signal is read across each pair of conductive probe members in turn.

In accordance with yet a further aspect of the invention, the control unit preferably includes a non-volatile memory or an electrically usable memory for storing monitor operating system code and a first memory for storing data values of each of the plurality of signals representative of the moisture content in each of the monitored walls from the plurality of moisture sensors. Further, outdoor temperature and relative humidity sensors are coupled to the control unit for sensing temperature and relative humidity of ambient air outside of the monitored building. The control unit includes, preferably, a second memory for storing, at each of the preselected time intervals, a second data value representative of the sensed temperature and relative humidity of the ambient air outside of the building. Alternatively, the moisture data values can be stored together with the temperature and relative humidity values in selected portions of a single shared memory device.

In accordance with yet a still further aspect of the invention, the control unit includes an alarm circuit for generating at least one of a visual alarm and an audible alarm when any of the signals representative of the moisture content in the plurality of monitored walls exceeds a predetermined threshold value. Preferably, the control unit further includes a communication circuit for communicating the alarm signal electronically to a location remote from the monitored building or structure.

In yet another aspect of the invention, a method is provided for detecting the presence of moisture behind cladding systems in exterior sheathing walls of a building. The method includes the steps of establishing a datum moisture parameter, periodically detecting a plurality of electrical moisture parameter values generated in a corresponding plurality of moisture sensors, and generating an alarm signal when at least one of the detected electrical parameter values is indicative of moisture in the exterior sheathing walls of the building in excess of the datum moisture parameter.

As can be seen from the foregoing, a primary object of the invention is the provision of a method and apparatus for automated monitoring of the moisture content in the plurality of exterior walls of a building covered by a hard exterior cladding.

A further object of the invention is the provision of an apparatus and method for detecting moisture in exterior sheathing walls of a building by disposing a plurality of moisture sensors in respective walls of the building, generating excitation signals from a control unit and thereby deriving moisture parameter values from each of the moisture sensors, and, when any of the detected moisture signals exceeds a predetermined moisture threshold parameter value, generating a visual and/or audible alarm signal representative of the sensed moisture intrusion.

Still other objects and advantages of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
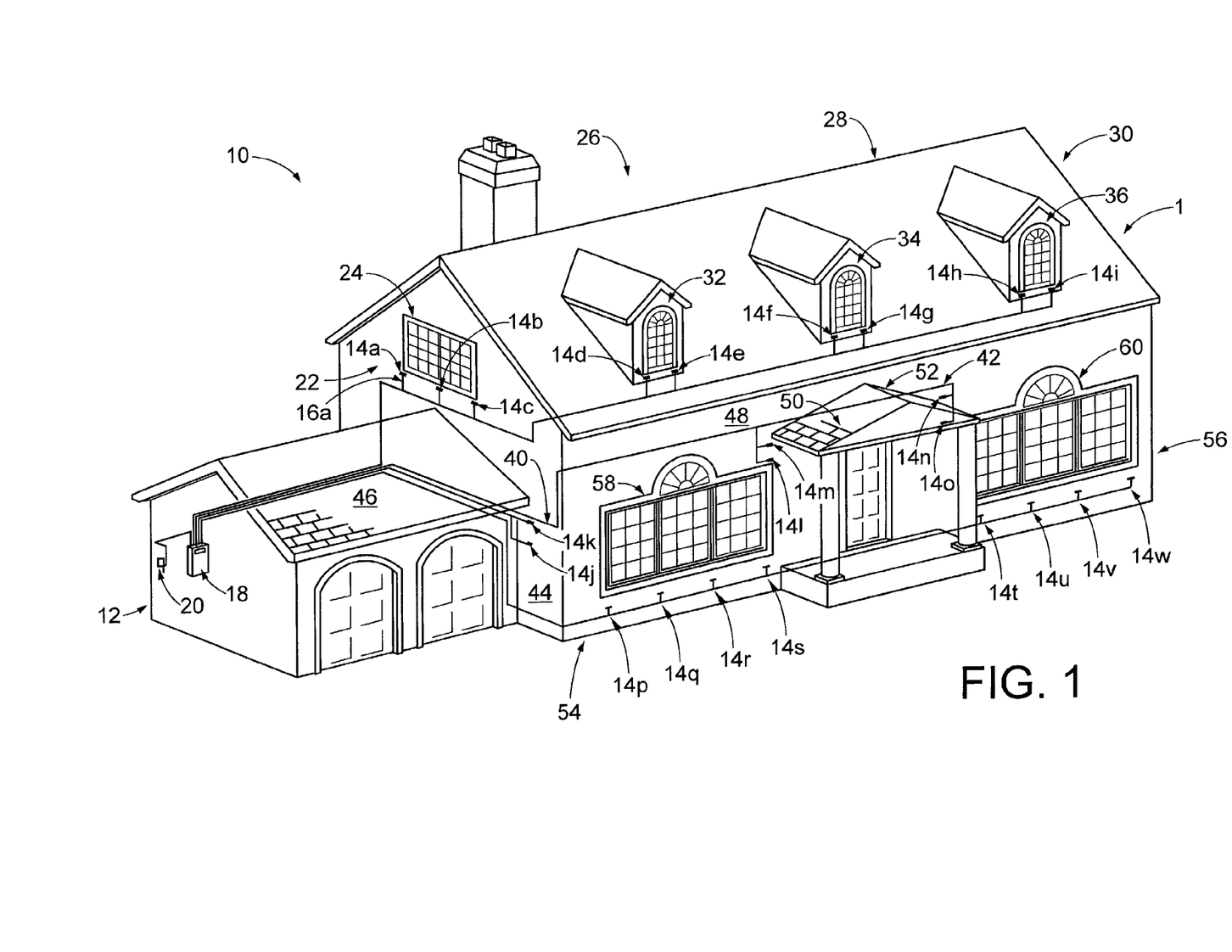
FIG. 1 is a perspective view of the moisture detection system of the present invention in a typical operating environment used in connection with a residential structure.

Referring now to the drawings wherein the showings are for the purposes of illustrating the preferred embodiment of the invention only and not for purposes of limiting same, the overall arrangement of the subject moisture detection system 10 applied to a residential structure can best be seen with reference to FIG. 1. Generally, the subject system 10 includes a central control unit 12 connected to a plurality of moisture sensors 14a–14w using a corresponding plurality of electrical connection cables 16a–16w. The central control unit 12 includes a central processing and communication device 18 and a temperature and relative humidity sensor 20.

Preferably, as illustrated, the central control unit 12 is disposed at a central location for convenient access such as, for example, in the garage of the residential structure 1. In that way, the control unit 12 and the plurality of electrical connection cables 16a–16w extending therefrom do not present a negative aesthetic effect. Further, preferably, each of the plurality of moisture sensors 14a–14w are strategically disposed throughout the residential structure 1 at various locations where moisture intrusion is likely to occur. In that regard, as shown, a first set of moisture sensors 14a–14c are disposed in a first zone 22 beneath a first side window 24 of the structure. As noted above, the most frequent source of water intrusion behind claddings is through improperly installed or defective doors or windows and other building elements that penetrate the cladding. Accordingly, as shown, the first set of sensors 14a–14c disposed in the first zone 22 are located immediately beneath the lower sill of the window 24.

Similarly, in the upper portion of the residential structure 1, second, third, and fourth moisture detection zones 26, 28, and 30, respectively are formed beneath second, third, and fourth upper story windows 32, 34 and 36 using moisture sensor pairs 14d/e, 14f/g, and 14h/i.

Fifth and sixth zones 40 and 42 are selected on the side and front vertical wall surfaces of the residential structure 1 as shown. A pair of moisture sensors 14j, k are disposed in the fifth zone to detect moisture intrusion in the side wall 44 of the structure immediately below the edge of the garage roof 46. The fifth zone 40 is a location likely to experience moisture intrusion due to water flowing from the roof and against the vertical side wall 44. Similarly, the sixth zone 42 includes a left pair of sensors 14l, m and a right pair of sensors 14n, o disposed in the front face wall 48 of the residential structure 1 immediately adjacent and slightly below the left and right porch roof portions 50, 52 where moisture intrusion is likely to occur due to rain water flowing from the roof portions and onto the front face wall 48 of the structure 1.

Lastly with reference to FIG. 1, seventh and eighth moisture detection zones 54, 56 are formed in the subject preferred embodiment using sensors 14p–14s and 14t–14w disposed beneath left and right bay windows 58, 60 on the front face wall 48 of the structure 1. Again, as further noted above, moisture intrusion is likely to occur through improperly designed or defective windows or doors or by means of a lack of flashing between door or window frames. Accordingly, the seventh and eighth moisture detection zone 54, 56 serve to monitor for moisture intrusion that may occur beneath the left and right bay windows 58, 60 respectively.

Figures 2, 3:
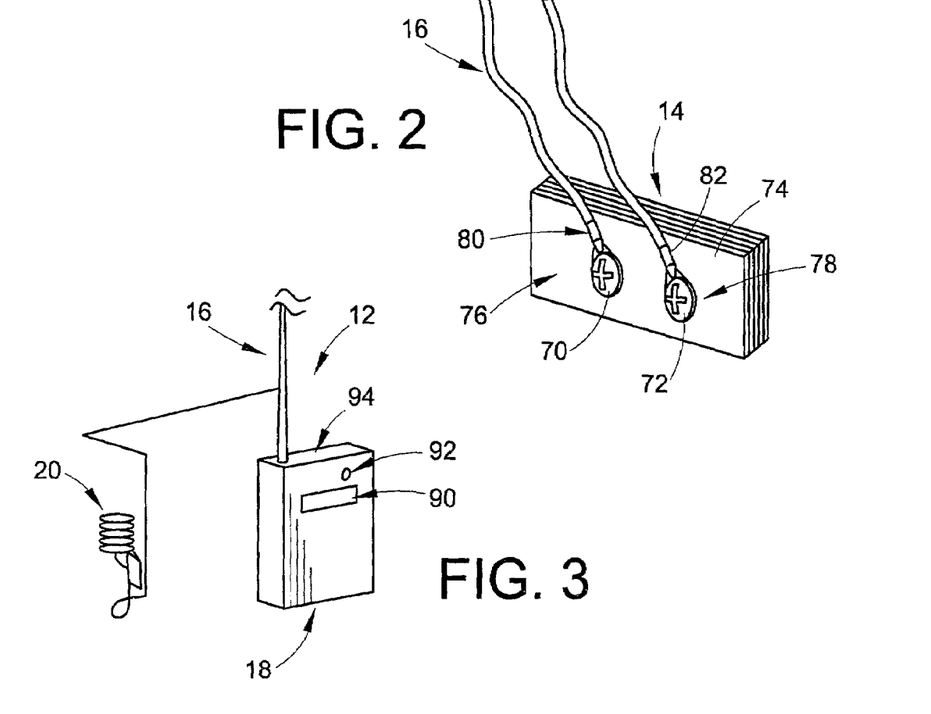
FIG. 2 is a schematic diagram showing the preferred moisture probe device used in the subject moisture detection system.
FIG. 3 is a schematic diagram showing a preferred control unit used in the subject moisture detection system.

FIG. 2 shows a moisture sensor 14 formed in accordance with the preferred form of the subject invention. With reference now to that figure, each of the plurality of moisture sensors 14a–14w is preferably identically formed and includes a pair of spaced apart elongate conductive probe members 70, 72 having a substantial portion thereof from a lead end (not shown) embedded into a substrate 74 of an exterior wall of the residential structure 1 and a connection end 76, 78 extending outwardly from the substrate 74 of the exterior wall for enabling electrical connection to the moisture sensor 14 using suitably arranged connection contact members 80, 82 which are in turn connected to the electrical connection cables 16.

In their preferred form, each of the plurality of moisture sensors 14 comprise zinc plated or stainless steel screws preferably one half inch in length. Preferably, each of the connection contact members 80, 82 comprise wiring terminals such as crimp or lug type connection devices for easily connecting the electrical connection cables 16 to each of the plurality of moisture sensors 14. Alternatively, other forms of electromechanical connection can be used for connecting the electrical connection cables 16 to the moisture sensors 14 such as, for example, solder connections or the like.

Turning next to FIG. 3, the preferred overall form of the control unit 12 in accordance with the present invention is shown and includes a central processing and communication device 18 adapted for electrical connection to the temperature and relative humidity sensor 20 and, further, for connection to the plurality of electrical connection cables 16a–16w. Human interface is provided by means of a digital status readout display 90 and a visual alarm light 92. Preferably, the alarm light 92 is an LED device that is selectively illuminated to indicate excessive moisture in one or more of the exterior walls of the residential structure based on a detection strategy described in greater detail below. An electronic communication port 94 is further provided on the control unit 12 so that alarm signals can be communicated electronically to locations remote from the residential structure.

Figure 4:
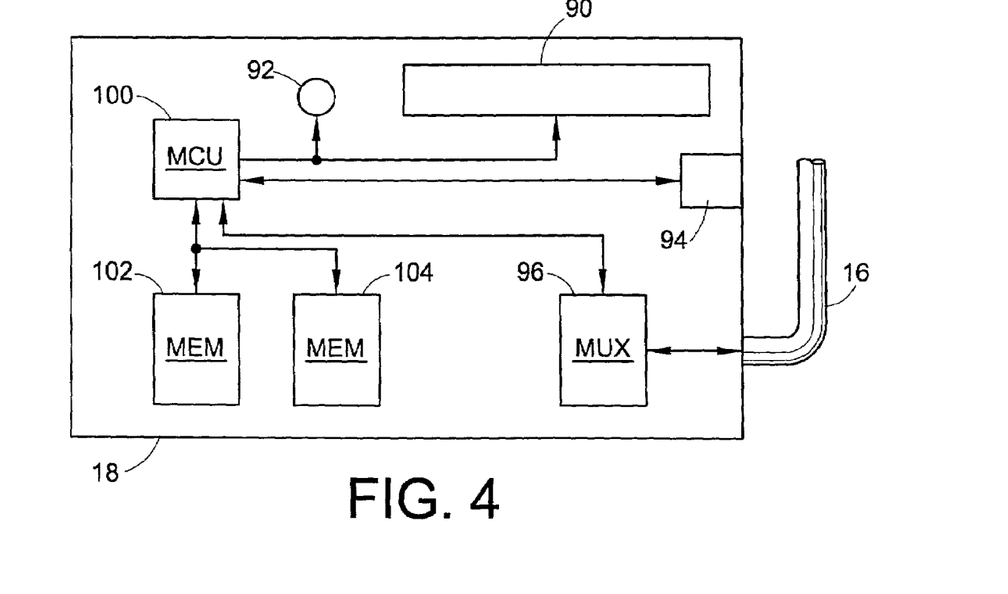
FIG. 4 is a schematic diagram illustrating the circuit components of the control unit shown in FIG. 3.

The central processing and communication device 18 of the subject control unit 12 is shown in greater schematic detail in FIG. 4. Referring now to that figure, the central processing and communication device 18 includes a micro controller unit 100 in operative communication with first and second memory devices 102, 104. Further, the MCU 100 is in operative control over the status display 90 as well as the alarm light 92 using suitable electronic interface and/or buffer circuits (not shown). Preferably, the MCU 100 includes internal programmable as well as random access memory capabilities for storing and executing programs for automated monitoring of the moisture content in the exterior walls of the subject residential structure. Further, preferably, the micro control unit 100 includes internal communication electronics for direct interfacing with the electronic communication port 94.

Figure 5:
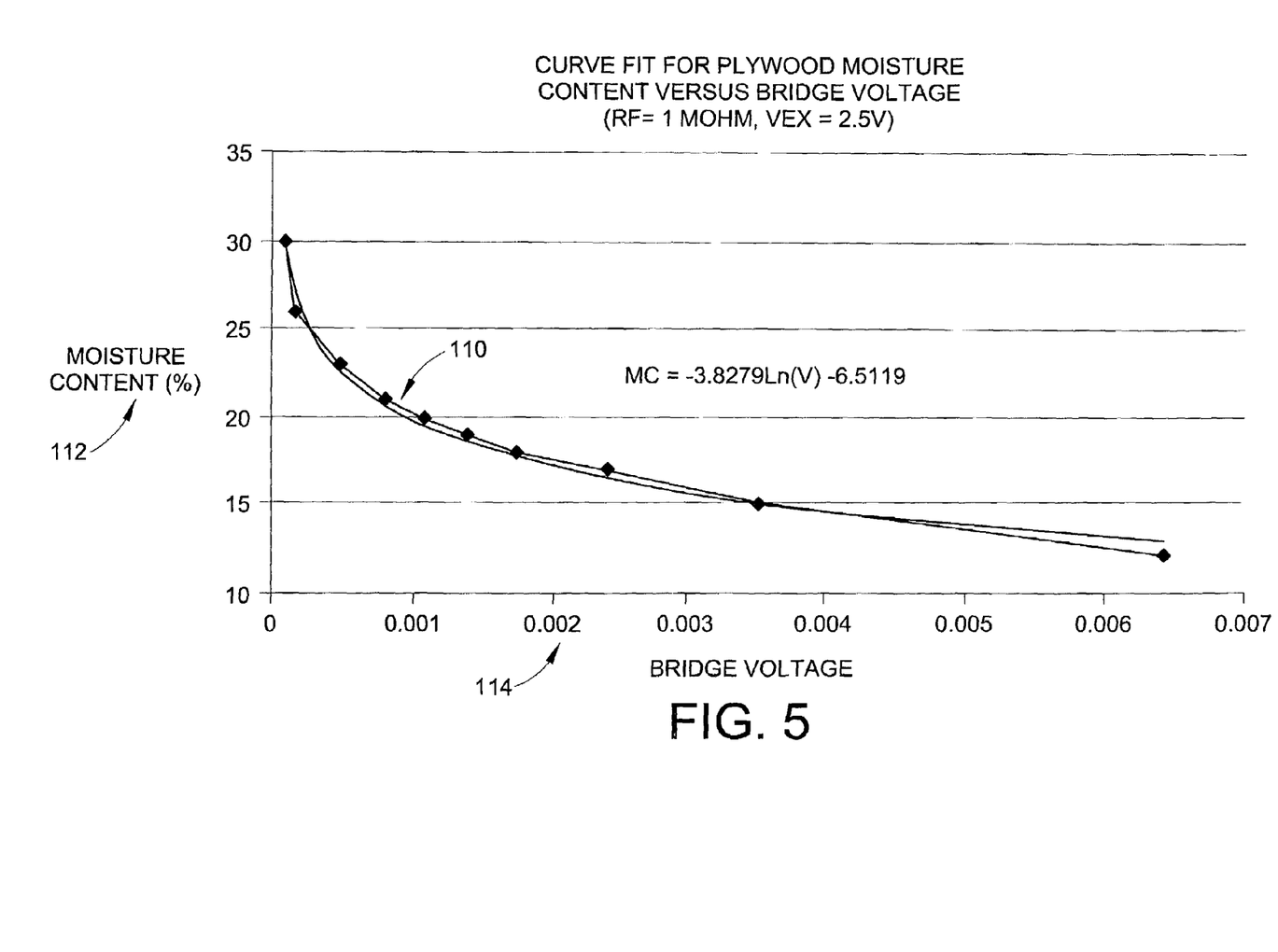
FIG. 5 is a plot illustrating a resistance characteristic based on sensed moisture content of the moisture sensors shown in FIG. 2; and, FIG. 6 is a flowchart illustrating a preferred method for detecting moisture intrusion in exterior building walls of a building in accordance with the present invention.

With continued reference to FIG. 4, preferably, the subject central processing and communication device 18 further includes a multiplexer circuit 96 for interfacing the single micro control unit 100 with the plurality of moisture sensors 14a–14w through the corresponding plurality of electrical connection cables 16a–16w. More particularly, the micro control unit 100 is adapted to generate, at preselected time intervals, a periodic excitation signal such as shown in FIG. 5 for application to each of the plurality of moisture sensors in turn. The multiplexer 96 and micro control unit 100 coordinate the application of the periodic excitation signal to each of the plurality of moisture sensors individually and, further, coordinate the return resistance signal for further processing by the micro control unit 100 to calculate a relative moisture in each of the exterior walls.

Generally, each of the moisture sensors 14a–14w shown in FIG. 2 exhibits a resistance characteristic shown with reference to FIG. 5. More particularly, the resistance characteristic 110 of each moisture sensor is a curve for direct calculation of a sensed moisture content 112 based on application of an excitation bridge voltage 114 across the pair of probe members 70, 72. Preferably, micro control unit 100 generates an excitation signal in the form of a predetermined small fixed or regulated voltage value preferably, 2.5 volts. The moisture content in the exterior walls of the structure directly affect the resistivity between the probe member pairs 70, 72 of each moisture sensor in accordance with the resistance characteristic curve 110. Therefore, application of a fixed voltage value to a bridge circuit formed in part by each individual sensor when connected generates a voltage drop across the conductive probe members based upon the moisture content in the exterior walls in accordance with the curve 110 for direct calculation by the micro control unit 100 of the moisture content 112. As an example, a bridge voltage drop of about 0.0035 volts across one of the moisture sensors in response to the application of the excitation signal would represent a moisture content in the plywood wall carrying the sensor of about 15%.

Figure 6:
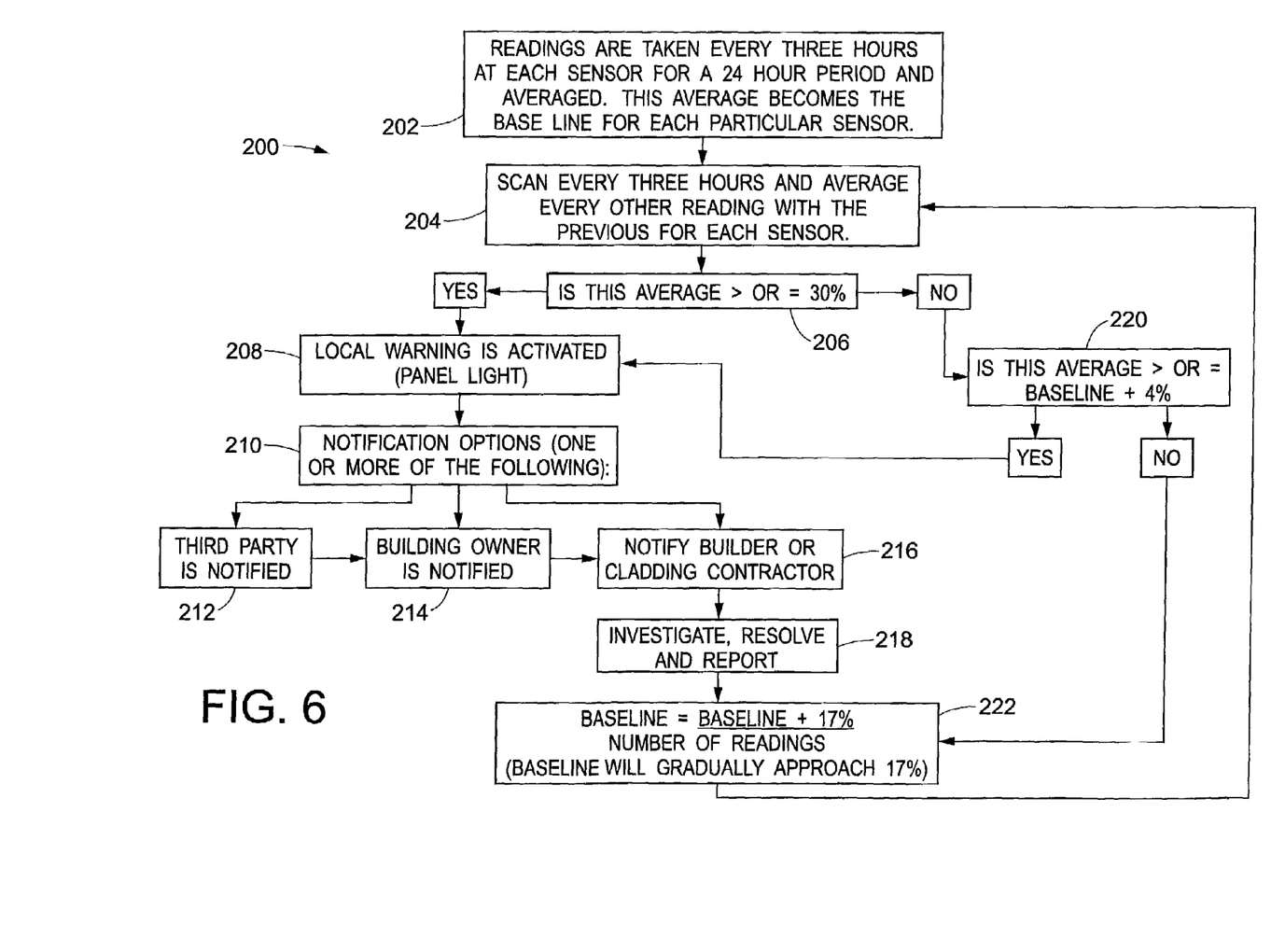

Turning lastly now to FIG. 6, the preferred method 200 for detecting the presence of moisture in exterior sheathing walls of the building will be described. For a first initial period 202, a datum moisture parameter is established for each sensor by disposing a set of electrode pairs in dry exterior sheathing walls of the residential structure 1 and then detecting an electrical parameter value between each electrode pair. The detected electrode parameter values are stored in either the first or second memory devices 102, 104 of the central processing and communication device 18. Preferably, readings are taken every three (3) hours at each sensor 14a–14w for a twenty-four (24) hour period and those sensor readings are averaged. This average value then becomes the baseline or datum moisture parameter value for each particular sensor.

After the first initial period 202, the electrode parameter values between each of the electrode pairs is periodically determined 204. For each moisture sensor, an average moisture content 112 is calculated based upon the resistance characteristic 110. Preferably, each sensor is scanned every three (3) hours every other reading is averaged with the previous reading for each sensor. A determination is made at step 206 whether the new average moisture content detected in each of the individual moisture sensors in step 204 is in excess of a predetermined moisture content (MC) value, preferably, 30%.

An alarm signal is generated at step 208 when the previously calculated average sensor value is indicative of a moisture content in the exterior sheathing walls of the building in excess of 30%. More particularly, preferably, the visual alarm light 92 on the central processing and communication device 18 is illuminated in step 208. However, alternatively, additional notification actions are taken at step 210 based on one or more parameters stored in the control unit. These notification actions preferably include notification of a third party 212, notification of the building owner 214, or notification 216 of the builder or cladding contractor whereupon an investigation action is initiated at step 218.

In the event that the average of the previous sensor reading and the current sensor reading does not exceed a predetermined threshold, preferably a MC of 30%, the most recently calculated average sensor value is compared in step 220 against the baseline sensor value determined in step 202 plus a MC of 4%. If the most recently calculated average sensor value exceeds the baseline value of the sensor plus a buffer value of preferably 4% moisture content, a local warning is activated in step 208 such as, preferably, the illumination of visual indicia or an audible alarm.

At step 222, when the most recently calculated average sensor value does not exceed the baseline MC value of that sensor plus a buffer MC value, a new baseline MC value is determined at step 222, preferably according to the following formula:

$$\text{Baseline} = \frac{\text{Baseline} + 17\%}{\text{Number of readings}}$$

As can be seen from the above calculation, the baseline MC value for each sensor will gradually approach 17%.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus for monitoring moisture content of an associated building, the apparatus comprising:
   a first moisture sensor adapted for placement in a first exterior wall of the associated building and to provide a first signal representative of a first moisture content in the first wall;
   a second moisture sensor adapted for placement in a second exterior wall of the associated building and to provide a second signal representative of a second moisture content in the second wall; and,
   a control unit operatively connected with said first and second moisture sensors, the control unit generating an alarm signal only when at least one of said first signal representative of the moisture content in the first wall and the second signal representative file moisture content in the second wall exceeds a non-zero threshold value.

2. The apparatus according to claim 1 wherein:
   the first moisture sensor has a first resistance characteristic that varies in relation to said first moisture content; and,
   the second moisture sensor has a second moisture characteristic that varies in relation to said second moisture content.

3. The apparatus according to claim 1 wherein said control unit includes an excitation signal circuit for generating an excitation signal applied to each of said first and second moisture sensors.

4. The apparatus according to claim 3 wherein:
   the first moisture sensor generates said first signal representative of the first moisture content in response to application of said excitation signal to said first resistance characteristic; and,
   the second moisture sensor generates said second signal representative of the second moisture content in response to application of said excitation signal to said second resistance characteristic.

5. The apparatus according to claim 1 wherein:
   the first moisture sensor includes spaced apart elongate conductive probe members and a connection end for enabling electrical connection to the first moisture sensor; and,
   the second moisture sensor includes spaced apart elongate conductive probe members and a connection end for enabling electrical connection to the second moisture sensor.

6. The apparatus according to claim 1 wherein the first and second moisture sensors are adapted for embedded placement and operation in an exterior sheathing wall of said associated building adjacent an outer cladding system including at least a one of a brick cladding, a metal cladding, clapboard siding, vinyl siding, and exterior insulation finish system cladding.

7. The apparatus according to claim 1 wherein:
   the control unit is adapted to generate an excitation signal applied to each of said first moisture sensor and said second moisture sensor;
   the first moisture sensor is responsive to said excitation signal to generate said first signal representative of the moisture content in the first wall; and,
   the second moisture sensor is responsive to said excitation signal to generate said second signal representative of the moisture content in the second wall.

8. The apparatus according to claim 7 wherein the control unit includes a first memory for storing a data value of said first signal representative of the first moisture content and a data value of said second signal representative of the second moisture content.

9. The apparatus according to claim 1 further including at least one of an outdoor temperature sensor and a relative humidity sensor coupled to said control unit for sensing temperature and relative humidity of ambient air.

10. The apparatus according to claim 1 wherein the control unit includes an alarm circuit for generating at least one of a visual alarm and an audible alarm when at least one of said first signal representative of the first moisture content and the second signal representative of the second moisture content exceeds said predetermined threshold.

11. The apparatus according to claim 1 wherein the control unit includes means for communicating said alarm signal electronically to a location remote from said building.

12. A method for detecting moisture comprising:
   for a first initial period, establishing a plurality of datum moisture parameters by:
   disposing a set of electrode pairs in exterior sheathing walls of the building;
   detecting electrical parameter values between each of the electrode pairs; and,
   storing the detected electrical parameter values as said plurality of datum moisture parameters;
   after said first initial period, periodically detecting the electrical parameter value between each of said set of electrode pairs; and,
   generating an alarm signal when, for each of the electrode pairs, a difference between the detected electrical parameter value and the datum moisture parameter is indicative of moisture in said exterior sheathing walls of the building in excess of said datum moisture parameter.

13. The method according to claim 12 wherein:
   the step of disposing said set of electrode pairs in said exterior sheathing walls of the building includes inserting a set of elongate electrically conductive electrode pairs directly into said exterior sheathing walls of the building at a plurality of predetermined locations; and,
   the step of periodically detecting said electrical parameter value includes periodically detecting an electrical resistivity between each of said set of elongate electrically conductive electrode pairs.

14. The method according to claim 12 wherein the step of generating said alarm signal includes generating at least one of a visual alarm display and an audible alarm sound when said difference between said detected electrical parameter value and the datum moisture parameter is indicative of moisture in said exterior sheathing walls of the building in excess of said datum moisture parameter.

15. The method according to claim 12 further including the step of providing a control unit operatively connected to each said electrode pair of the set of electrode pairs, the control unit including a first memory for storing the detected electrical parameter value as said datum moisture parameter and a processor for periodically detecting the electrical parameter value between said set of electrode pairs by periodically generating and delivering an excitation signal to each said electrode pair of the set of electrode pairs and determining said electrical parameter value between said set of electrode pairs.

16. The method according to claim 15 wherein the step of providing said control unit includes:
   providing a first data log memory operatively associated with said processor for storing a log of said periodically detected electrical parameter values; and,
   providing a communication unit operatively associated with said processor for communicating said alarm signal electronically to a remote location.

17. The method according to claim 16 wherein the step of providing the communication unit includes providing a modem device operatively associated with said processor for communicating said alarm signal electronically to said remote location through an associated standard telephone line.

18. An apparatus for automated moisture monitoring in walls of an associated building, the apparatus comprising:
   a first moisture sensor disposed at a first wall of said associated building, the first moisture sensor being adapted to provide a first signal representative of a first moisture content of said first wall; and,
   a control unit operatively connected with the first moisture sensor, the control unit generating an alarm signal in response to the first signal representative of the first moisture content of said first wall exceeding a predetermined non-zero threshold value.

19. The apparatus according to claim 18 wherein the first moisture sensor includes spaced apart elongate conductive probe members adapted for embedded placement into said first wall of the associated building and a connection end extending outwardly for enabling electrical connection to the first moisture sensor.

20. The apparatus according to claim 19 wherein the control unit includes a first memory for storing a data value of said first signal representative of the first moisture content.

21. The apparatus according to claim 20 further including:
   a plurality of moisture sensors, each of the plurality of moisture sensors having a resistance characteristic that varies in relation to said moisture content and being adapted to provide signals representative of a moisture content in response to application of an excitation signal.

22. Apparatus for monitoring moisture content of an associated building, the apparatus comprising:
   a first moisture sensor located at a first wall in a first zone of the associated building, the first moisture sensor being adapted to provide a first signal representative of a first moisture content at said first zone;
   a second moisture sensor located at a second wall in a second zone of the associated building, the said moisture sensor being adapted to provide a second signal representative of a second moisture content; and,
   a control unit in operative communication with said first and second moisture sensors at said first and second zones, the control unit generating an alarm signal when at least one of said first signal and the second signal exceeds a non-zero threshold value.

23. The apparatus according to claim 22 wherein:
   the first moisture sensor includes a plurality of first moisture sensors having a first resistance characteristic that varies in relation to said first moisture content at said first zone of the associated building; and,
   the second moisture sensor includes a plurality of second moisture sensors having a second moisture characteristic that varies in relation to said second moisture content at said second zone of the associated building.

24. The apparatus according to claim 22 wherein:
   the first moisture sensor includes first spaced apart elongate conductive probe members; and,
   the second moisture sensor includes second spaced apart elongate conductive probe members.

25. The apparatus according to claim 22 wherein the first and second moisture sensors are adapted for embedded placement and operation in an exterior sheathing wall of said associated building adjacent an outer cladding system including at least a one of a brick cladding, a metal cladding, clapboard siding, vinyl siding, and exterior insulation finish system cladding.

26. The apparatus according to claim 22 wherein the control unit includes a communication portion for communicating said alarm signal electronically to a location remote from said building.

27. A method for detecting moisture in a building comprising:
   for a first initial period, establishing a plurality of datum moisture parameters by:
   disposing a set of moisture sensors in the building;
   detecting electrical parameter values of said moisture sensors; and,
   storing the detected electrical parameter values as said plurality of datum moisture parameters;
   after said first initial period, periodically detecting the electrical parameter value of each of said set of moisture sensors; and,
   generating an alarm signal when, for each of the moisture sensors, a difference between the detected electrical parameter value and the datum moisture parameter is indicative of moisture in said building in excess of said datum moisture parameter.

28. The method according to claim 27 wherein:
   the step of disposing said set of moisture sensors in said building includes inserting a set of elongate electrically conductive electrodes directly into exterior sheathing walls of the building at a plurality of predetermined locations; and,
   the step of periodically detecting said electrical parameter value includes periodically detecting an electrical resistivity of said set of elongate electrically conductive electrodes.

29. The method according to claim 27 further including providing a control unit in operative communication with said moisture sensors, the control unit including a first memory for storing the detected electrical parameter value as said datum moisture parameter and a processor for periodically detecting the electrical parameter value.

30. The apparatus according to claim 18 wherein said first moisture sensor is disposed in said first wall of said associated building.

31. The apparatus according to claim 22 wherein:
said first moisture sensor is located in said first wall in said first zone of the associated building; and,
said second moisture sensor is located in said second wall in said second zone of the associated building.

* * * * *

UNITED STATES PATENT AND TRADEMARK OFFICE
CERTIFICATE OF CORRECTION

PATENT NO. : 7,126,486 B2  Page 1 of 1
APPLICATION NO. : 10/060183
DATED : October 24, 2006
INVENTOR(S) : Kroll et al.

It is certified that error appears in the above-identified patent and that said Letters Patent is hereby corrected as shown below:

In column 7, in claim 1, at line 39, please remove "file" and substitute --of the-- therefor.

Signed and Sealed this

Twelfth Day of February, 2008

JON W. DUDAS
*Director of the United States Patent and Trademark Office*